United States Patent [19]

Meadows

[11] Patent Number: 4,576,118

[45] Date of Patent: Mar. 18, 1986

[54] PET FEEDING BOWL

[76] Inventor: Winston R. Meadows, 2961 Collier Dr., N.W., Atlanta, Ga. 30318

[21] Appl. No.: 707,880

[22] Filed: Mar. 4, 1985

[51] Int. Cl.⁴ .............................................. A01K 5/00
[52] U.S. Cl. ..................................... 119/62; 220/20.5
[58] Field of Search ............................. 119/62, 61, 72

[56] References Cited

U.S. PATENT DOCUMENTS 648,953  5/1900  Hanson .................................. 119/62
1,082,610 12/1913 Shrawder ............................... 119/62
1,507,159  9/1924 Cosford ................................. 119/62

Primary Examiner—Jay N. Eskovitz
Attorney, Agent, or Firm—Newton, Hopkins & Ormsby

[57] ABSTRACT

A pet feeding bowl is equipped with hinged apertured cover plates which are biased closed by gravity to protect food in the bowl from contamination and are opened when the pet thrusts its snout into the bowl for feeding. The cover plate apertures allow the animal to detect the scent of food from a distance.

7 Claims, 2 Drawing Figures

PET FEEDING BOWL

BACKGROUND OF THE INVENTION

Pet feeders equipped with animal-controlled covers are known in the prior art. One such device is disclosed in U.S. Pat. No. 3,121,419 where the weight of the feeding animal on a treadle operates a feeding bowl cover through a linkage.

The object of the present invention is to provide a greatly simplified, more compact and less expensive pet feeder having apertured cover plates which are influenced by gravity to normally closed level positions where the food in the feeder is protected. When a pet seeking food thrusts its snout into the feeder, the cover plates are engaged and swing toward open vertical positions to thereby expose the food for consumption. Following withdrawal of the pet's snout, the hinged cover plates return automatically to their closed level positions. The apertures in the cover plates allow the pet to smell the food from a distance.

Other features and advantages of the invention will become apparent to those skilled in the art during the course of the following description.

DETAILED DESCRIPTION

Figure 1:
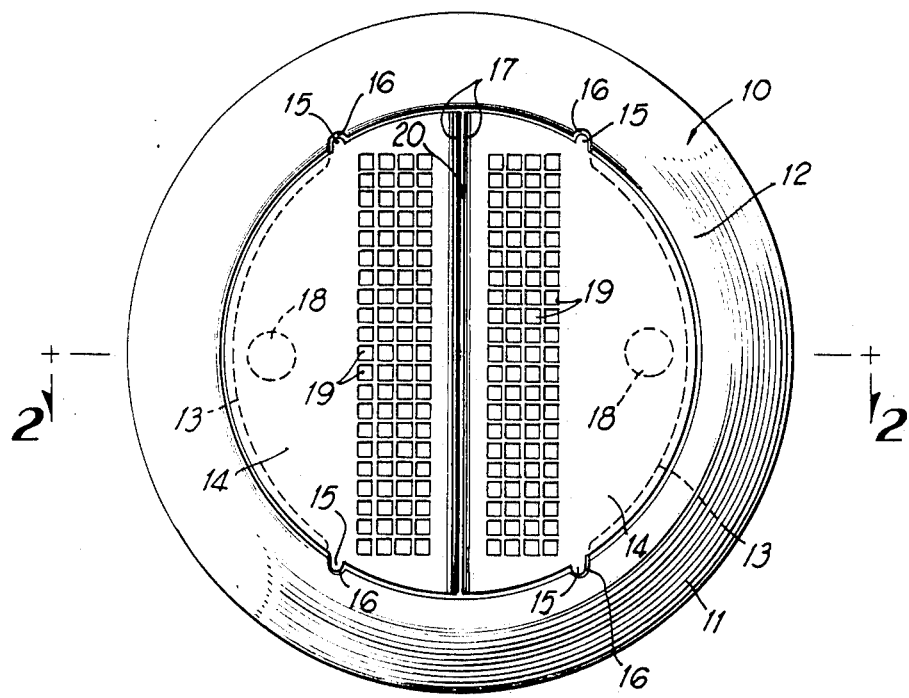
FIG. 1 is a plan view of a pet feeding bowl according to the present invention.

Referring to the drawings, wherein like numerals designate like parts, the pet feeding bowl is an integral or unitary member turned, drawn or stamped from a disc of sheet metal or molded from plastic or any other element or compound which may prove durably and/or economically feasible, and is generally symmetrical about a vertical axis. The outer portion of the bowl is defined by an annular, frusto-conical, upwardly converging skirt 11 having a planar diametrically extending lower base or edge 9 on which the bowl 10 rests. The upper edge portion of skirt 11 terminates in a plane parallel to and above the lower edge 9, this upper edge 11 being reversely bent, inwardly, to define an upper annular, upwardly convex rim or annular bight portion 12, from the inner portion of which is suspended the inner bowl 10 within the confines of the skirt 11.

Between the upper edge of bowl 10 and the inner edge of rim 12 are a pair of cresent shaped, radially extending, diametrically opposed, arcuate shoulders 13 which are in a common plane, parallel to and slightly below the rim 12. Shoulders 13 removably support a pair of opposed flat semi-circular cover plate sections 14 which lie thereon in a common transverse plane. The peripheral edge of sections 14 are of a diameter slightly less than the inside diameter of lip 12 so as to be loosely confined thereby when the plate sections 14 are received on the shoulders 13.

Plate sections 14 terminate in opposed straight, spaced, parallel, inner flange carrying edges, which are bent downwardly to provide and support a pair of spaced, opposed complimentary, curved flanges 17. The flanges 17 are thus integrally formed with the plate sections 14 and are, themselves, semi-cylindrical members which curve inwardly about spaced parallel horizontal axes, so as to prolude toward each other and downwardly for providing abutting, outer, convex surfaces which are spaced from each other and define therebetween a diametrically extending access open 20.

Inwardly of the opposed flanges 19, the peripherical edges of each plate section 14 is provided with a pair of opposed outwardly protruding trunnion 15 which are respectively received in grooves 16 so as to seat in these grooves 16 for pivoting. Grooves 16 are inwardly and upwardly opening vertically disposed recesses in the interior wall of the rim or bight portion 12. Flanges 17 are closely adjacent to each other when the cover plate sections 14 are closed, level and resting on the arcuate shoulders 13.

Small counterweights 18 are fixed to the bottom faces or surfaces of cover plate sections 14 radially outwardly of the pivot axes defined by the pairs of lugs 15 and bias the cover plate sections 14 toward their closed level positions, by gravity. The cover plate sections 14 are free to swing downwardly at their inner straight edges, as there are no shoulders present in this area to resist such downward movement. When the cover plate sections 14 are closed, the curled flanges 17, which are parallel, lie substantially on a diametrical axis of the bowl in closely spaced relationship.

The cover plate sections 14 are each provided with a multitude of apertures 19 in rectangular zones on opposite sides of the flanges 17 and inwardly of the hinge axes of the two cover plate sections. The scent of food escaping through the apertures 19 can be detected by a pet some distance from the bowl so as to attract the pet to the feeding bowl.

Figure 2:
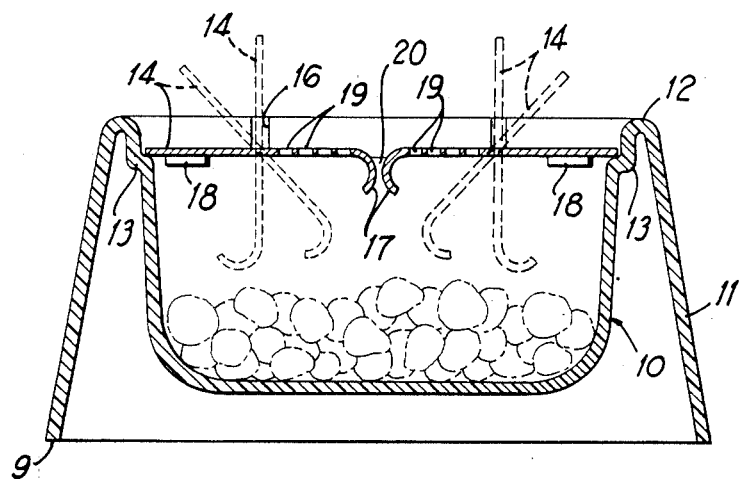
FIG. 2 is a central vertical section taken on line 2—2 of FIG. 1.

The pet seeking food thrusts its snout downwardly against the cover plate sections 14 in the region of the apertures 19, and the two cover plate sections respond by swinging downwardly on their hinge axes toward the vertical positions shown in broken lines in FIG. 2. In such positions, the cover plate sections 14 are separated and there is ample space for the pet to reach the food. Upon withdrawal of the pet's snout from the bowl, the two cover plate sections return automatically by gravity to their level closed positions where they protect the food from contamination.

Since the grooves 16 are open at their tops, the lugs 15 can be lifted from the grooves and the cover plate sections separated from the bowl to facilitate cleaning.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A pet feeding bowl of the type having a bowl body portion defining an interior at about ground level for receiving and retaining food therein, said bowl body portion having an open top through which the pet can have access to the food retained in said bowl body portion, the improvement comprising:

(a) a cover for essentially closing the top portion of said bowl body portion, said cover having a pair of opposed moveable cover plate sections which in their closed position respectively extend from opposite sides of said bowl body portion over the open top of said bowl body portion for covering the food in said bowl body portion said cover plate sections when in their closed positions having adjacent edge portions abutting each other in the central portion of said bowl cover plate sections and being carried in a common horizontal plane by said bowl body portion, said edge portions of said cover plate sections curved downwardly for being engageable by the nose or snout of a pet to urge the cover plate sections away from each and thereby move them to their open positions as the pet inserts his snout or nose between said plates and through said open top toward said food; and (b) means for biasing said cover plate sections for returning said cover plate sections to their closed positions when the pet removes his snout or nose from said bowl body position.

2. The pet feeding bowl defined in claim 1 wherein the downwardly curved edge portions for providing opposed flanges defining a straight transverse opening there between.

3. The pet feed bowl defined in claim 1 wherein said cover plate sections are provided with arcuate outer edge portions, said bowl body portions being provided with horizontally disposed arcuateshoulders for respectively supporting said arcuate outer edge portions when said cover plate sections are in their closed positions, said arcuate shoulders supporting said arcuate outer portions so as to dispose said cover plate sections in a generally common horizontal plane when they are in their closed positions.

4. The pet feeding bowl defined in claim 3 including lugs extending from opposite edge portions of each of said cover plate members, said lugs being pivotally received by said bowl body portion for permitting pivoting of said cover place sections when said pet inserts his nose or snout between the abutting edge portions of said cover plate sections, said arcuate edge portions of said supporting cover plate sections, pivoting upwardly about said lugs when said pet urges the abutting edge portions of said cover plate sections downwardly.

5. The pet feeding bowl defined in claim 4 wherein said cover plate sections are provided with openings adjacent to said abutting edges of said cover plate sections.

6. The pet feeding bowl defined in claim 1 including lugs extending from opposite edge portions of each of said cover plate sections, said lugs being received by said bowl body portion for permitting pivoting of said cover plate sections when said pet inserts his nose or snout between the abutting edge portions of said cover plate sections.

7. The pet feeding bowl defined in claim 1 wherein said cover plate members are pivotally carried by said bowl and said means for biasing said cover plate sections include diametrically opposed weight on the inner surfaces of the edge portions of said cover plate sections.

* * * * *